United States Patent
Ike et al.

(10) Patent No.: US 7,704,401 B2
(45) Date of Patent: Apr. 27, 2010

(54) LIQUID TREATMENT APPARATUS AND LIQUID TREATMENT METHOD

(75) Inventors: Hideaki Ike, Kitakyushu (JP); Kazunori Hakiai, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 12/272,090

(22) Filed: Nov. 17, 2008

(65) Prior Publication Data

US 2009/0071910 A1   Mar. 19, 2009

Related U.S. Application Data

(63) Continuation-in-part of application No. PCT/JP2007/054875, filed on Mar. 13, 2007.

(30) Foreign Application Priority Data

May 31, 2006   (JP) .............................. 2006-151538

(51) Int. Cl.
   *C02F 1/30* (2006.01)
(52) U.S. Cl. ................... 210/748; 210/764; 210/758; 210/749; 422/186.04; 422/231; 422/906
(58) Field of Classification Search ............. 210/739, 210/748, 600, 758; 205/560; 424/489; 422/186.21
   See application file for complete search history.

(56) References Cited

U.S. PATENT DOCUMENTS

2003/0146310 A1* 8/2003 Jackson ...................... 239/690

2004/0007539 A1* 1/2004 Denes et al. ................. 210/748

FOREIGN PATENT DOCUMENTS

| JP | 5-319807 A | 12/1993 |
| JP | 2001-10808 A | 1/2001 |
| JP | 2003-126849 A | 5/2003 |
| JP | 2003-126850 A | 5/2003 |
| JP | 2003-236551 A | 8/2003 |
| JP | 2004-143519 A | 5/2004 |
| JP | 2005-58887 A | 3/2005 |
| JP | 2007-117853 A | 5/2007 |
| JP | 2007117853 A * | 5/2007 |

OTHER PUBLICATIONS

Japanese Office Action dated Aug. 17, 2009.

* cited by examiner

*Primary Examiner*—Walter D Griffin
*Assistant Examiner*—Cameron J Allen
(74) *Attorney, Agent, or Firm*—Sughrue Mion, PLLC

(57) ABSTRACT

A liquid treatment apparatus and a liquid treatment method are provided. The liquid treatment apparatus includes a nozzle configured to cause cavitation bubbles to be generated in liquid to be treated, and a discharger which generates discharge plasma in a region where the cavitation bubbles are generated. The liquid treatment method includes causing the cavitation bubbles to be generated in the liquid to be treated, and generating discharge plasma in the region where the cavitation bubbles are generated.

15 Claims, 4 Drawing Sheets

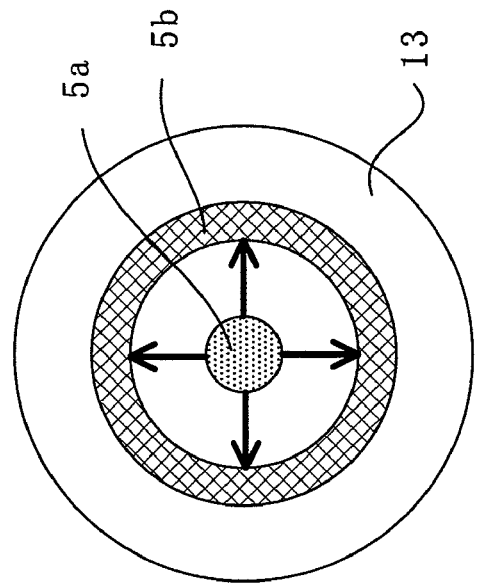
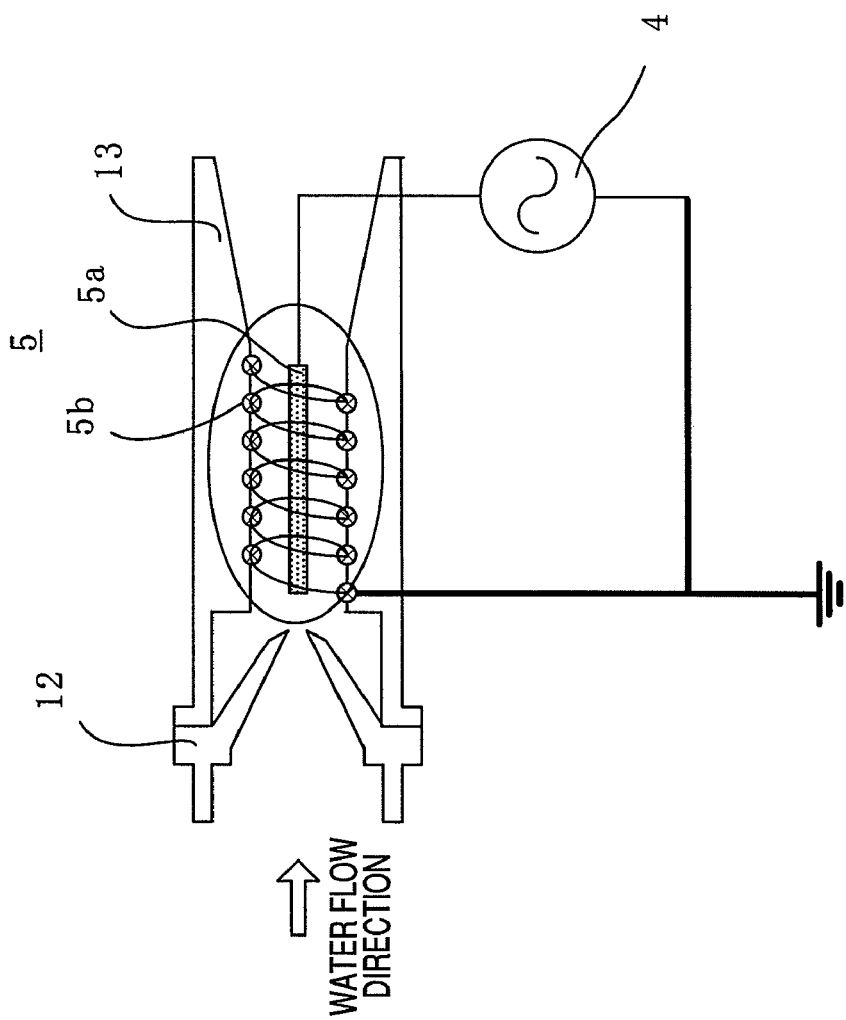

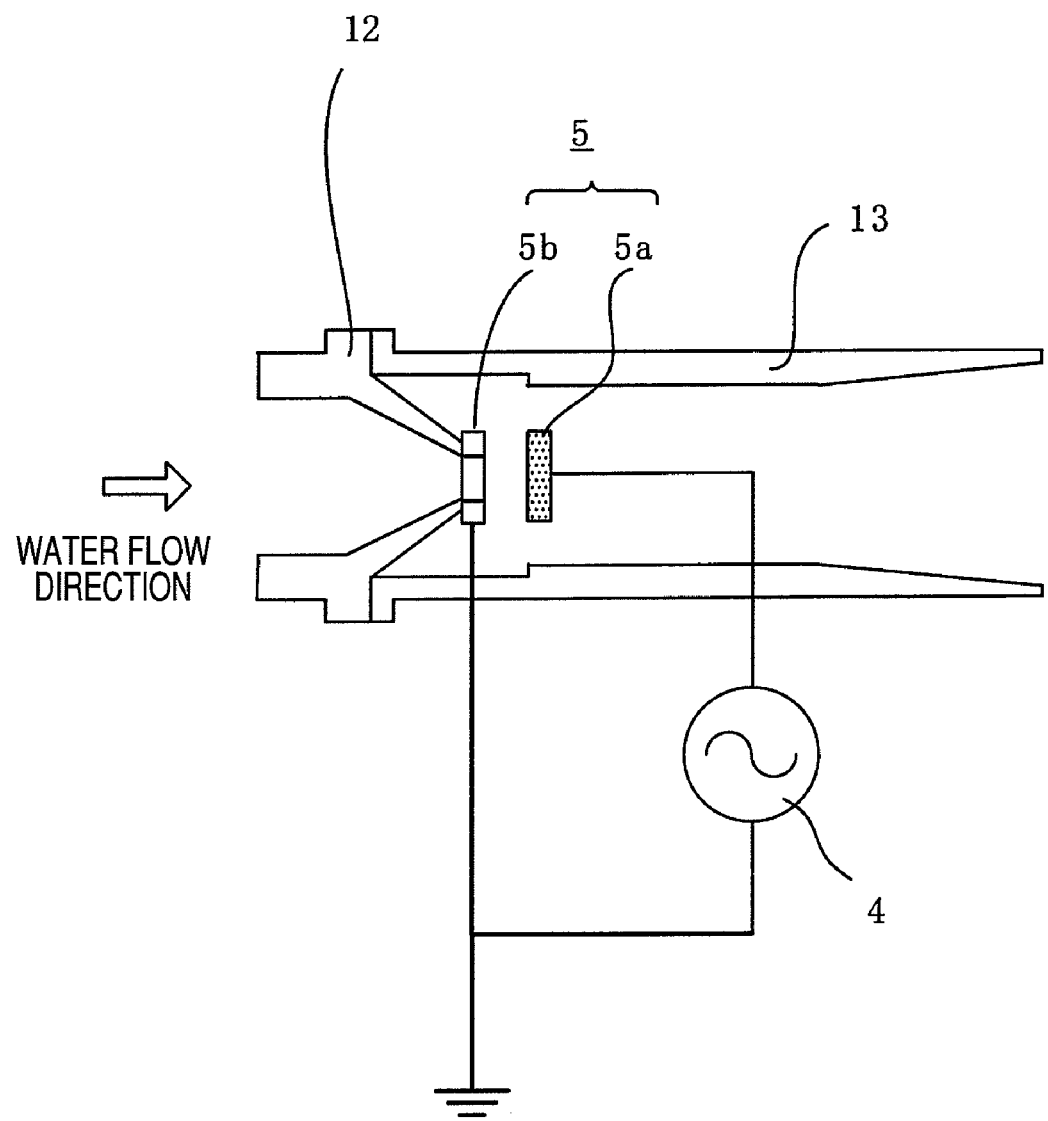

LIQUID TREATMENT APPARATUS AND LIQUID TREATMENT METHOD

RELATED APPLICATIONS

This application is a continuation-in-part of International Patent Application Ser. No. PCT/JP2007/054875, filed Mar. 13, 2007, which claims the benefit of the filing date under 35 U.S.C. §119(a)-(d) of Japanese Patent Application Ser. No. JP 2006-151538, filed May 31, 2006 all of which are incorporated herein by reference.

FIELD OF THE INVENTION

The present invention relates to a liquid treatment apparatus and a liquid treatment method which are used to treat water containing organic matter, microbes, bacteria or ammonia in connection with tap water, sewage, industrial wastewater, garbage disposal facility leachate, livestock wastewater, industrial water or effluent, food processing water or effluent, semiconductor cleaning water or drainage thereof, pool water, ship ballast water or drainage thereof, polluted water in rivers and lakes, or the like.

DESCRIPTION OF RELATED ART

In recent years, a treatment method of purifying water using active species, such as ozone and hydroxy radicals generated by discharge, is becoming established in removing harmful or unpleasantness-causing organic matter and bacteria contained in service water or wastewater.

The active species such as ozone and hydroxy radicals have strong oxidizability to oxidize and decompose organic matter dissolved in water. Therefore, such active species are becoming widely adopted as means for reducing COD (Chemical Oxygen Demand), decoloring, deodorizing, sterilizing and removing harmful persistent organic matter or the like in tap water and sewage as well as in various kinds of service water and wastewater such as industrial water and effluent, pool water, ship ballast water and drainage thereof.

In a general treating method using ozone, ozone gas is generated by providing air or high-concentration oxygen through a discharge space, and is dissolved into water by diffusing or the like to contact and react with substances to be removed. However, this method has some problems such as poor electric power efficiency, large-size apparatus, and high cost.

In order to address such problems, there is proposed a method in which aeration with air or oxygen is actively and efficiently carried out between electrodes placed in water to create fine bubbles, and discharge is generated in the bubbled environment (see, e.g., JP 5-319807 A).

Further, instead of carrying out active aeration between the electrodes as described above, there is also proposed another method in which fine bubbles having uniform size and serving as discharge cores are effectively generated inside the entire discharge space (see, e.g., JP 2001-10808 A).

However, both of the methods have the following problems in common.

In order to generate the fine bubbles for creating the discharge space, equipments for supplying air or oxygen gas and micronizing the bubbles are provided. In addition, it is obviously predictable that equipment for deaerating the water containing undissolved bubbles and equipment for treating discharged gas after the deaeration are also necessary. For such reasons, downsizing and cost reduction of the apparatus are extremely difficult.

Further, pressure inside the micronized bubbles is substantially equal to or higher than the atmospheric pressure. Therefore, sparkover voltage for forming the discharge space is high, which means that a high voltage needs to be applied. Accordingly, a power receiving system becomes large-sized.

SUMMARY OF THE INVENTION

According to an aspect of the present invention, a liquid treatment apparatus includes a nozzle configured to cause cavitation bubbles to be generated in liquid to be treated, and a discharger which generates discharge plasma in a region where the cavitation bubbles are generated.

Other aspects and advantages of the invention will be apparent from the following description, the drawings and the claims.

BRIEF DESCRIPTION OF THE DRAWINGS

While the specification concludes with claims particularly pointing out and distinctly claiming the subject matter which is regarded as the invention, it is believed that the invention, the object and features of the invention and further objects, features and advantages thereof will be better understood from the following description taken in connection with the accompanying drawings in which:

FIG. 2 is a sectional view of a portion including electrodes according to another embodiment of the present invention;

FIG. 3 is a sectional view of a portion including another type of electrodes according to yet another embodiment of the present invention.

DETAILED DESCRIPTION OF PREFERRED EMBODIMENTS

Figure 1:
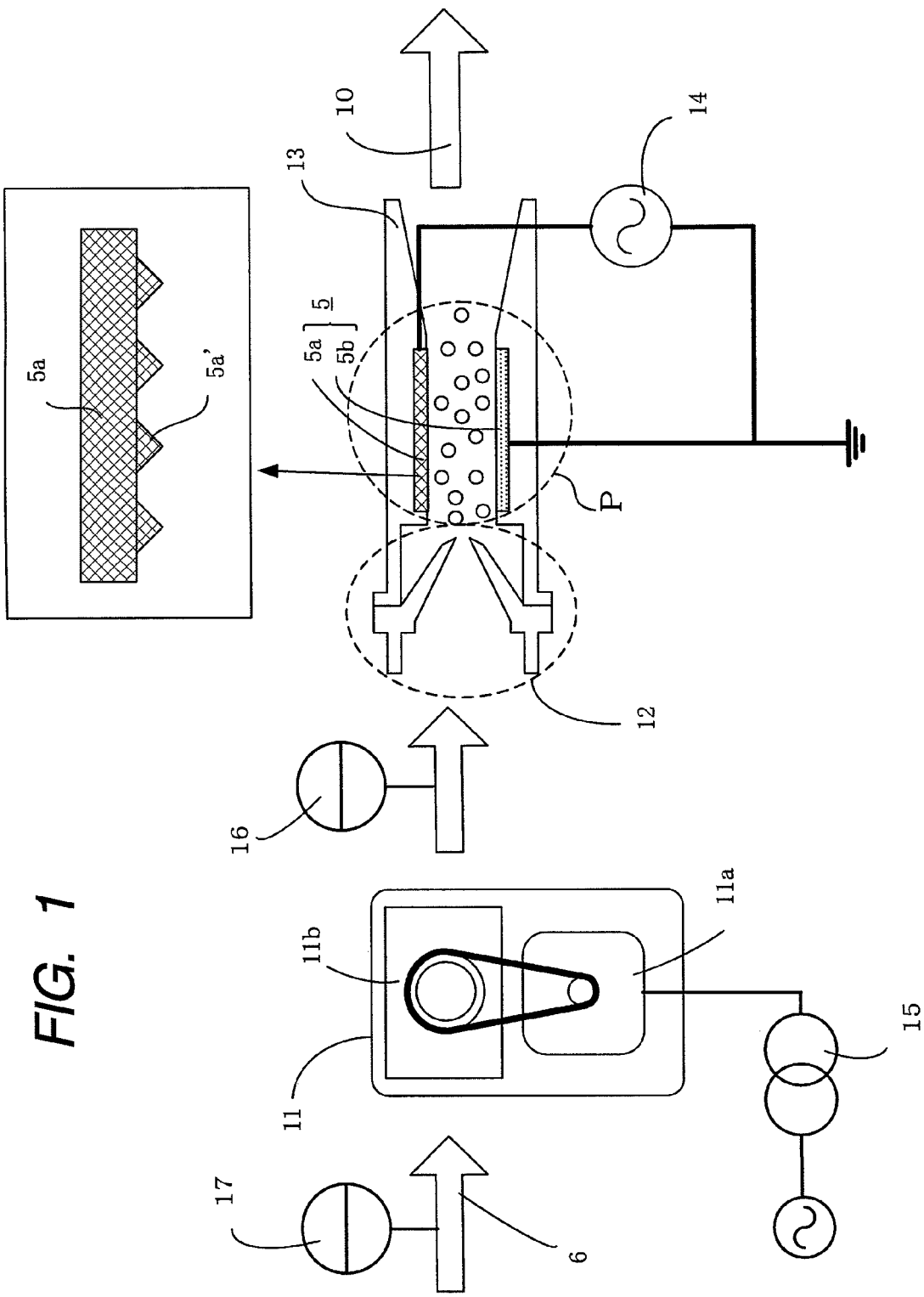
FIG. 1 is a schematic configuration diagram of a liquid treatment apparatus according to an embodiment of the present invention.

Hereinafter, embodiments of the present invention will be described with reference to the drawings. In the drawings, some elements are illustrated in frame format for easy understanding of the present invention. Further, in the following embodiments, similar elements may be indicated with the same reference numerals, and the description thereof may be omitted.

FIG. 1 is a schematic configuration diagram of a liquid treatment apparatus according to an embodiment of the present invention. The liquid treatment apparatus of the embodiment is a water treatment apparatus including a pressurization pump 11 which feeds water 6 to be treated with a given pressure, a nozzle 12 which creates cavitation bubbles in the water-to-be-treated 6 fed from the pressurization pump 11, a discharger P having opposed electrodes 5 to generates discharge plasma in a cavitation region where the cavitation bubbles are created, a water conduit 13, a high-voltage power supply 14, a high-voltage insulating transformer, pressure monitor device 16, and a conductivity meter 17.

The pressurization pump 11 is arranged on an upstream side of the nozzle 12, and the electrodes 5 are arranged on a downstream side of the nozzle 12. The electrodes 5 are opposed to each other inside the water conduit 13 with a certain space therebetween. According to the water treatment apparatus of the embodiment, in addition to chemical actions which are mainly caused by active species such as ozone and hydroxy radicals, synergetic effect with physical actions which is caused by impactive force generated upon collapse of the bubbles can be obtained, whereby treatment efficiency can be significantly enhanced.

Next, operations in the water treatment apparatus of the embodiment will be described.

(1) The water-to-be-treated 6 is fed by the pressurization pump 11 with a given pressure to the nozzle 12 which is disposed in the middle portion of the conduit. The nozzle 12 has an orifice shape, and right after passing through the most contracted portion, there is a rapid pressure fall in this downstream area. In an area where the pressure falls below the saturation vapor pressure of liquid, numerous small cavitation bubbles are generated due to boiling phenomenon.

The pressure of the water fed by the pressurization pump 11 is preferably set almost within a range of 0.1-1.5 MPa, although it depends on quality of the water to be treated.

(2) In the vicinity of the downstream side of the nozzle 12, the electrodes 5, respectively made of stainless steel and having a flat plate structure, are arranged inside the water conduit 13 so as to be opposed to each other with a certain distance therebetween. A discharge surface of the anode side (a high voltage side) of the electrodes is configured to have protrusions 5a' as shown in the drawing, whereby sparkover voltage can be lowered and a stabilized discharge space can be formed. When the cavitation bubbles pass through this space, high voltage of a high-frequency having sine waveform, pulse waveform or rectangular waveform is applied from the high-voltage power supply 14, whereby vapor and oxygen contained in the cavitation bubbles are excited due to high-density electric energy and active species such as hydroxyl radicals and ozone are generated. These active species are promptly dissolved into the water to be treated, and effectively react with the organic substances to be treated to decompose them. At the same time, sterilization with respect to microbes and fungi can be carried out due to a strong electric field and ultraviolet rays which are created in the discharge space. The distance between the electrodes may preferably be 30 mm or less. Although appropriate voltage to applied and frequency thereof depend on the distance between the electrodes, and quality, flow rate and pressure of the water to be treated, they may preferably be set within a range of 10 kV or less and 10 kHz or less respectively. Further, while the electrodes are made of stainless steel in the embodiment, material and configuration of the electrodes are not specifically limited. For example, surfaces of the electrode may be coated with inorganic insulating material or the like.

(3) The cavitation bubbles disappear in a region where the flow rate reduces and the pressure increases. Due to a rapid shrinkage of the bubbles, impactive force is generated within the bubbles. This impactive force can destroy floating substances, microbes or the like mixed in the water to be treated.

When the phenomena (2) and (3) described above exist within the same space, owing to the synergetic effect thereof, the organic matter to be removed can be strongly and efficiently treated, whereby clean treated water 10 can be obtained.

According to the above, equipment for supplying air or oxygen or equipment for micronizing the bubbles is not required. Further, since the cavitation bubbles disappear in a short time and no bubbles are left in the water to be treated, equipment for deaeration or for treating exhaust gas is also not required. Accordingly, it is possible to provide a compact apparatus with low cost. Furthermore, since the micronized cavitation bubbles are generated under the atmospheric pressure or below, the sparkover voltage is low. Therefore, the power receiving equipment can be downsized, and reliability of the apparatus is enhanced.

In addition, in order to improve reliability and safety of the apparatus and to carry out a stable treatment, following configurations (4) to (6) are provided.

(4) The pressurization pump 11 is configured such that an motor 11a and a pump 11b are arranged on an insulating base and are spaced away from each other by a given insulation distance, and such that a rotation shaft of the motor 11a and a rotation shaft of the pump 11b are coupled to each other through a V belt made of insulating material or through another insulating member. Further, a power source for driving the pressurization pump 11 supplies power through the high-voltage insulating transformer 15. Accordingly, when electric potential difference of the pump 11b or the motor 11a of the pressurization pump 11 becomes high voltage through the water-to-be-treated 6 upon application of high voltage to the electrodes 5, grounding through a low voltage power supply system can be prevented, thereby preventing damage of the apparatus and an electric shock to a human body.

(5) The pressure monitoring device 16 is provided to monitor a pressure on the upstream side of the nozzle 12 or a pressure difference between the upstream side and the downstream side of the nozzle 12. When there is an abnormality in water flowing state, the pressure monitoring device 16 detects a variation in the pressure to immediately stop the application of the high voltage or the operation of the apparatus.

(6) The conductivity meter 17 is provided to monitor a conductivity of the water-to-be-treated 6, and when the conductivity of the water 6 is increased due to a change in the quality of the water 6 or the like, the application of the high voltage or the operation of the apparatus is stopped. This makes it possible to prevent a stable discharge generation and treatment from being inoperable.

FIGS. 2 and 3 are sectional views of portions including electrodes according to other embodiments of the present invention. These embodiments illustrate examples of an arrangement of the electrodes 5. FIG. 2 illustrates an example in which a line-shaped or a rod-shaped electrode 5a (an anode side or a high voltage side) and an electrode 5b (a cathode side, a grounding side) of a spiral-shaped wire are disposed in a pair with constant distance therebetween. According to this arrangement of the electrodes 5, the electrodes 5 can easily be formed inside a conduit having a circular section, and a high water treatment effect can be obtained due to high discharge generating efficiency. While the cathode side (the grounding side) electrode 5b is formed in a spiral shape in this embodiment, the same effect can be obtained also when the electrode 5b has a meshed configuration.

FIG. 3 illustrates another example in which a ring-shaped electrode 5b (a cathode side or a grounding side) is attached to a distal end portion of the nozzle 12 so as not to block the water flow passage, and a flat plate electrode 5a (an anode side or a high voltage side) is disposed inside the water conduit 13 so as to oppose to the electrode 5a with a certain distance therebetween. In a region where the electrodes are arranged is situated, the pressure is reduced the most inside the water conduit 13 because it is right after the water-to-be-treated 6 passes through the most contracted portion of the orifice, and the generation of cavitation bubbles is facilitated. Thus, the discharge can be generated with a lower sparkover voltage. Further, since it is possible to reduce a conduit resistance when the water to be treated passes through between the electrodes, the flow rate of the water-to-be-treated 6 can be increased while reducing feeding pressure thereof, whereby the treating efficiency is improved. The orifice portion of the nozzle 12 may generally be made of insulating material such as ceramics or resin. However, it may also be made of metal material such as stainless steel to serve also as an electrode. While the electrode 5a is used as the anode side (the high voltage side) electrode and the electrode 5b is used as the cathode side (the grounding side) electrode, they may also be arranged reversely.

Figure 4:
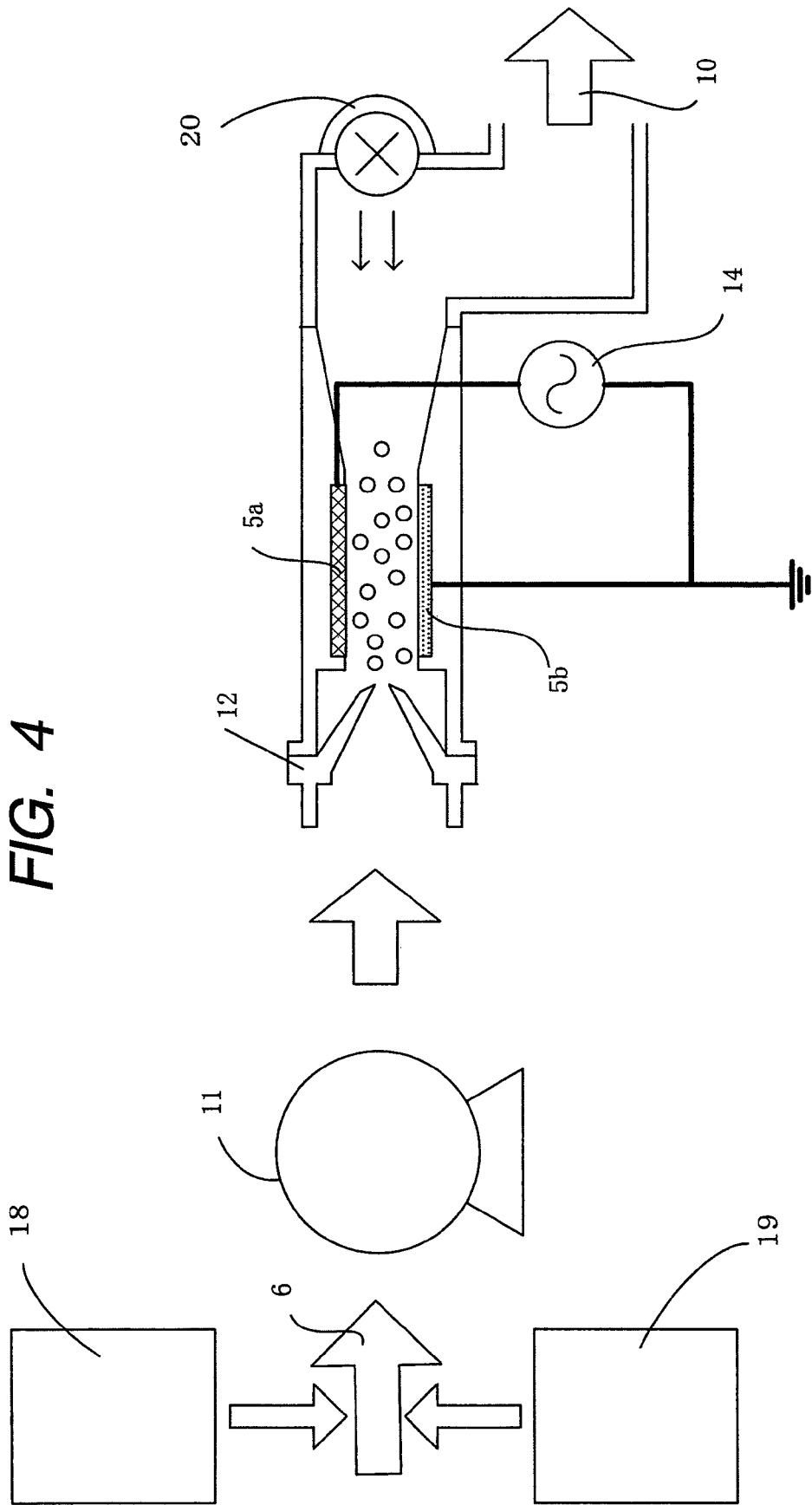
FIG. 4 is a schematic configuration diagram of a liquid treatment apparatus according to yet another embodiment of the present invention.

FIG. 4 is a schematic configuration diagram of a liquid treatment apparatus according to a yet another embodiment of the present invention. According to this embodiment, a radical generation facilitating function is added to the water treatment apparatus described above. More specifically, the water treatment apparatus according to this embodiment includes, in addition to the water treatment apparatus described above, an injector 18 which injects hydrogen peroxide, enricher 19 which enriches dissolved oxygen, and an irradiator 20 which irradiates ultraviolet rays.

The injector 18 injects a suitable amount of hydrogen peroxide from the upstream side or the downstream side of the pressurization pump 11. The irradiator 20 irradiates ultraviolet rays of a short wavelength of 300 nm or below directly toward the discharge space between the electrodes 5. The enricher 19 is provided to increase dissolved oxygen level of the water to be treated in a storage vessel or the like (not shown) disposed on the upstream side of the pressurization pump 11, by means of aeration with high-concentration oxygen or the like. According to this configuration, the generation of active species such as ozone or hydroxyl radicals is facilitated, thereby enabling further improvement in decomposing effect of persistent organic matter or the like and the treating efficiency.

As described above, it is possible to eliminate the use of equipment for supplying air or oxygen, equipment for micronizing the bubbles as well as equipments for deaeration and treating exhaust gas. Further, since the micronized cavitation bubbles are generated under the atmospheric pressure or below, the sparkover voltage is low, whereby the reliability of the apparatus becomes high. Furthermore, a synergetic effect with physical actions, e.g., action of impactive force generated upon collapse of the cavitation bubbles, can be greatly expected. Furthermore, the generation of active species such as ozone or hydroxyl radicals is facilitated, and the decomposing effect of persistent organic matter or the like is improved. Accordingly, it is possible to provide a compact and highly reliable water treatment apparatus with low cost.

The present invention provides an excellent potential effect in inactivating microbes and bacteria. Specifically, it is also applicable against ozone-resistant microbes such as cryptosporidium, with respect to which a strong effect could not have been expected only with a chemical treatment using ozone or the like, and also in sterilizing ballast water which is recently being raised as a problem.

Further, the present invention is not limited to water treatment, and is applicable in a wide range of fields, e.g., decomposition of PCB and a treatment for making chemicals harmless, with respect to various kinds of liquids in which cavitation bubbles can be generated by lowering pressure of the liquid to be treated to be a saturation vapor pressure thereof or below on the downstream side of the nozzle.

What is claimed is:

1. A liquid treatment apparatus comprising:
    a nozzle having an orifice shape, generating cavitation bubbles due to boiling phenomenon in an area where pressure falls after passing through a most contracted portion of the orifice shape, in liquid to be treated; and
    a discharger generating discharge plasma in a region where the cavitation bubbles are generated.

2. The liquid treatment apparatus according to claim 1, further comprising a pressurization pump arranged on an upstream side of the nozzle to feed the liquid toward the nozzle.

3. The liquid treatment apparatus according to claim 1, the discharger comprising electrodes arranged to interpose there between the region where the cavitation bubbles are generated.

4. The liquid treatment apparatus according to claim 3, wherein the electrodes comprise either:
    a combination of two among a line-shaped electrode, a rod-shaped electrode and a flat plate electrode, the combination including a combination of electrodes having the same shape, or
    a combination of a line-shaped electrode or a rod-shaped electrode and a spiral-shaped electrode.

5. The liquid treatment apparatus according to claim 3, further comprising a liquid conduit arranged on a downstream side of the nozzle,
    wherein the electrodes comprise:
    an electrode arranged on a periphery of a distal end portion of the nozzle; and
    an opposed electrode disposed inside the liquid conduit.

6. The liquid treatment apparatus according to claim 3, wherein protrusions are formed on a surface of the electrodes.

7. The liquid treatment apparatus according to claim 2, wherein the pressurization pump comprises:
    a motor;
    a pump;
    an insulating base on which the motor and the pump are arranged so as to be spaced away from each other; and
    an insulating member through which a rotation of the motor is transmitted to the pump.

8. The liquid treatment apparatus according to claim 1, wherein the pressurization pump comprises:
    a power source; and
    a high-voltage insulating transformer through which power is supplied from the power source.

9. The liquid treatment apparatus according to claim 1, further comprising a pressure monitor device which, while the liquid is flowing, monitors a pressure on the upstream side of the nozzle or a pressure difference between the upstream side and a downstream side of the nozzle.

10. The liquid treatment apparatus according to claim 1, further comprising a conductivity meter which monitors a conductivity of the liquid to be treated.

11. The liquid treatment apparatus according to claim 1, further comprising injector which injects hydrogen peroxide into the liquid to be treated.

12. The liquid treatment apparatus according to claim 1, further comprising irradiator which irradiates ultraviolet ray toward the region where the cavitation bubbles are generated.

13. The liquid treatment apparatus according to claim 1, further comprising enricher arranged on an upstream side of the nozzle to enrich dissolved oxygen in the liquid.

14. A liquid treatment method comprising:
    causing cavitation bubbles to be generated, due to boiling phenomenon in an area where pressure falls after passing through a most contracted portion of an orifice shape formed in nozzle, in liquid to be treated; and
    generating discharge plasma in a region where the cavitation bubbles are generated.

15. A liquid treatment apparatus comprising:

means for generating cavitation bubbles to be generated, due to boiling phenomenon in an area where pressure falls after passing through a most contracted portion of an orifice shape formed in nozzle, in liquid to be treated; and means for generating discharge plasma in a region where the cavitation bubbles are generated.

* * * * *